United States Patent
Xiao et al.

(10) Patent No.: US 11,196,183 B2
(45) Date of Patent: Dec. 7, 2021

(54) FEEDING DEVICE, ANTENNA, AND ELECTRONIC DEVICE

(71) Applicant: HUAWEI TECHNOLOGIES CO., LTD., Guangdong (CN)

(72) Inventors: Weihong Xiao, Xi'an (CN); Dantao Cai, Dongguan (CN); Junfeng Lu, Xi'an (CN); Shuangfei Wang, Xi'an (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/899,096

(22) Filed: Jun. 11, 2020

(65) Prior Publication Data
US 2020/0303838 A1 Sep. 24, 2020

Related U.S. Application Data

(63) Continuation of application No. PCT/CN2018/120110, filed on Dec. 10, 2018.

(30) Foreign Application Priority Data

Dec. 11, 2017 (CN) .......................... 201711310137.7

(51) Int. Cl.
*H01Q 23/00* (2006.01)
(52) U.S. Cl.
CPC .................................. *H01Q 23/00* (2013.01)
(58) Field of Classification Search
CPC ........ H01Q 1/246; H01Q 21/24; H01Q 21/26; H01Q 19/10; H01Q 19/108; H01Q 1/48; H01Q 3/32; H01Q 1/38; H01Q 21/22; H01Q 21/28; H01Q 21/0006; H01Q 3/26; H01Q 1/36; H01Q 21/0075; H01Q 25/00; H01Q 3/40; H01Q 23/00; H01Q 3/36; H01Q 5/42; H01Q 9/16; H01Q 21/061; H01Q 9/26; H01Q 1/125; H01Q 1/1257; H01Q 1/242; H01Q 1/243; H01Q 21/0025;
(Continued)

(56) References Cited

U.S. PATENT DOCUMENTS 6,995,726 B1 2/2006 West et al.
2002/0118521 A1 8/2002 Kooker et al.
(Continued)

FOREIGN PATENT DOCUMENTS

CN 2872609 Y 2/2007
CN 201937008 U 8/2011
(Continued)

OTHER PUBLICATIONS

Office Action issued in Chinese Application No. 201711310137.7 dated Sep. 4, 2020, 6 pages (with English translation).
(Continued)

*Primary Examiner* — Monica C King
(74) *Attorney, Agent, or Firm* — Fish & Richardson P.C.

(57) ABSTRACT

This application discloses feeding devices, antennas, and electronic devices. In one implementation, a feeding device comprises a phase shifter, a combiner, and a jumper component, wherein the phase shifter has a first cavity, the combiner has a second cavity adjacent to and connected to the first cavity, and the phase shifter is connected to the combiner through the jumper component.

11 Claims, 9 Drawing Sheets

(58) Field of Classification Search
CPC .... H01Q 21/08; H01Q 21/245; H01Q 25/001; H01Q 5/307; H01Q 5/371; H01Q 19/17; H01Q 1/521; H01Q 1/523; H01Q 21/0081; H01Q 21/062; H01Q 21/30; H01Q 3/24; H01Q 1/1228; H01Q 1/1264; H01Q 1/405; H01Q 1/428; H01Q 1/52; H01Q 25/002; H01Q 3/005; H01Q 3/247; H01Q 3/30; H01Q 3/34; H01Q 3/38; H01Q 3/44; H01Q 5/30; H01Q 5/328; H01Q 5/40; H01Q 9/04; H01Q 9/0457; H01Q 9/06; H01Q 9/065; H01Q 9/28; H01Q 13/206; H01Q 15/14; H01Q 1/002; H01Q 1/42; H01Q 1/50; H01Q 21/00; H01Q 21/06; H01Q 21/205; H01Q 21/29; H01Q 3/04; H01Q 3/06; H01Q 3/2605; H01Q 5/10; H01Q 5/45; H01Q 5/48; H01Q 5/49; H01Q 5/50; H01Q 9/32
See application file for complete search history.

(56) References Cited

U.S. PATENT DOCUMENTS

| | | |
|---|---|---|
| 2008/0063015 A1 | 3/2008 | Trifonov et al. |
| 2013/0155588 A1 | 6/2013 | Shi et al. |
| 2015/0155609 A1* | 6/2015 | Fang ........................ H01Q 3/32 333/136 |
| 2018/0108990 A1* | 4/2018 | Xiao ........................ H01P 1/18 |

FOREIGN PATENT DOCUMENTS

| | | |
|---|---|---|
| CN | 103493287 A | 1/2014 |
| CN | 103975485 A | 8/2014 |
| CN | 105762535 A | 7/2016 |
| CN | 206003933 U | 3/2017 |
| CN | 106654494 A | 5/2017 |
| CN | 206401476 U | 8/2017 |
| CN | 107146927 A | 9/2017 |
| CN | 107181062 A | 9/2017 |
| CN | 206541914 U | 10/2017 |
| EP | 3223368 A1 | 9/2017 |
| WO | 2016192009 A1 | 12/2016 |
| WO | 2017036339 A1 | 3/2017 |

OTHER PUBLICATIONS

Extended European Search Report issued in European Application No. dated Dec. 11, 2020, 9 pages.
Office Action issued in Chinese Application No. 201711310137.7 dated Nov. 1, 2019, 14 pages (with English translation).
Office Action issued in Chinese Application No. 201711310137.7 dated May 7, 2020, 13 pages (with English translation).
PCT International Search Report and Written Opinion issued in International Application No. PCT/CN2018/120110 dated Feb. 27, 2019, 13 pages (with English translation).

* cited by examiner

FEEDING DEVICE, ANTENNA, AND ELECTRONIC DEVICE

CROSS-REFERENCE TO RELATED APPLICATIONS

This application is a continuation of International Application No. PCT/CN2018/120110, filed on Dec. 10, 2018, which claims priority to Chinese Patent Application No. 201711310137.7, filed on Dec. 11, 2017. The disclosures of the aforementioned applications are hereby incorporated by reference in their entireties.

TECHNICAL FIELD

This application relates to the communications field, and in particular, to a feeding device, an antenna, and an electronic device.

BACKGROUND

An antenna is one of important components of an electronic device, and the electronic device receives and sends data by using the antenna. The antenna includes components such as a feeding device and a radiating element. The feeding device is configured to convert current signals that are of different frequency bands and that need to be sent into current signals of current intensity and a phase that are required by the radiating element, and then the radiating element converts the converted current signals into electromagnetic wave signals and radiates the electromagnetic wave signals.

However, a volume of an existing feeding device structure is relatively large, and in particular, a connection between a phase shifter and a combiner is not tight enough, and a loss of the feeding device is relatively large.

SUMMARY

To reduce a volume of a feeding device and reduce a signal loss of the feeding device, embodiments of this application provide a feeding device, an antenna, and an electronic device. The technical solutions are as follows.

According to a first aspect, this application provides a feeding device, including a phase shifter, a combiner, and a jumper component. The phase shifter has a first cavity, the combiner has a second cavity, the first cavity is adjacently connected to the second cavity, and the phase shifter is connected to the combiner by using the jumper component. In this way, a distance between the phase shifter and the combiner may be shortened, so that the jumper component is relatively short, thereby reducing a volume of the feeding device, and reducing a signal loss of the feeding device.

In a possible implementation of the first aspect, a quantity of phase shifters included in the feeding device is M, M is an integer greater than 1, and first cavities of different phase shifters are a same cavity.

In a possible implementation of the first aspect, a quantity of phase shifters included in the feeding device is M, M is an integer greater than 1, and first cavities of different phase shifters are different cavities. In this way, isolation between two adjacent phase shifters may be increased, and signal impact mutually generated between the two adjacent phase shifters may be reduced.

In a possible implementation of the first aspect, when first cavities of different phase shifters are different cavities, the first cavities of the different phase shifters are placed side by side in an up-and-down direction, or placed side by side in a left-and-right direction. Specifically, upper and lower cavity walls of different first cavities are laminated, or left and right cavity walls of different first cavities are laminated. The lamination may be partial lamination or full lamination, that is, a part or all of an upper cavity wall of one first cavity of two different first cavities is laminated to a part or all of a lower cavity wall of the other first cavity. Alternatively, a part or all of a right cavity wall of one first cavity of two different first cavities is laminated to a part or all of a left cavity wall of the other first cavity. The upper, lower, left, and right herein are merely examples. This is not limited in this application. In this way, different first cavities are tighter, to facilitate connection between the phase shifter and the phase shifter, and connection between the phase shifter and the combiner, thereby reducing a loss of the feeding device.

In a possible implementation of the first aspect, a quantity of combiners included in the feeding device is N, where N is an integer greater than or equal to 1; and a second cavity of a $j^{th}$ combiner has only one chamber, the $j^{th}$ combiner further includes M tributary units, all the M tributary units correspond to a same second cavity, and a $j^{th}$ output end of an $i^{th}$ phase shifter is connected to an $i^{th}$ tributary unit of the $j^{th}$ combiner by using the jumper component, where i=1, 2, . . . , and M. In this way, a quantity of cavities may be reduced, thereby reducing a volume of the feeding device and facilitating miniaturization of the feeding device.

In a possible implementation of the first aspect, a quantity of combiners included in the feeding device is N, where N is an integer greater than or equal to 1; and a second cavity of a $j^{th}$ combiner includes M chambers, and the $j^{th}$ combiner further includes M tributary units, where M is an integer greater than 1, and j=1, 2, . . . , and N. An $i^{th}$ tributary unit of the $j^{th}$ combiner is in a one-to-one correspondence with an $i^{th}$ chamber, and a $j^{th}$ output end of an $i^{th}$ phase shifter is connected to the $i^{th}$ tributary unit of the $j^{th}$ combiner by using the jumper component, where i=1, 2, . . . , and M. In this way, isolation between two adjacent combiners and isolation between tributary units of a same combiner may be increased, thereby improving performance of the feeding device.

In a possible implementation of the first aspect, the M chambers of the second cavity are placed side by side in an up-and-down direction, or placed side by side in a left-and-right direction. Specifically, chamber walls of two adjacent chambers are completely or partially laminated. In this way, chambers of the combiner are easily adjacently connected to each other, so that a structure of the combiner is tighter, to facilitate connection between the combiner and the combiner, and connection between the combiner and the phase shifter, thereby reducing a loss of the feeding device.

In a possible implementation of the first aspect, at least one first cavity and at least one second cavity are integrally formed. Specifically, a part or all of a lower cavity wall of the first cavity and a part or all of an upper cavity wall of the second cavity are a same cavity wall, or a part or all of a left cavity wall of the first cavity and a part or all of a right cavity wall of the second cavity are a same cavity wall. The upper, lower, left, and right herein are merely examples. This is not limited in this application. In this way, the at least one first cavity is adjacently connected to the at least one second cavity, thereby reducing a loss caused by interconnection between the first cavity and the second cavity.

In a possible implementation of the first aspect, the jumper component includes a metal sheet and a plug connector, where the plug connector is fastened at an edge of the metal sheet; and the metal sheet is welded to the phase shifter, and the plug connector is plug-connected to the combiner, or the metal sheet is welded to the combiner, and the plug connector is plug-connected to the phase shifter. In this way, when the plug connector is plug-connected to the phase shifter, the metal sheet is supported, so that the metal sheet is welded to the combiner; or when the plug connector is plug-connected to the combiner, the metal sheet is supported, so that the metal sheet is welded to the phase shifter.

In a possible implementation of the first aspect, the metal sheet and the plug connector are integrally formed.

According to a second aspect, this application provides an antenna, including the feeding device according to any one of the first aspect or possible implementations of the first aspect.

According to a third aspect, this application provides an electronic device, including the feeding device according to any one of the first aspect or possible implementations of the first aspect, and/or the antenna according to the second aspect.

DESCRIPTION OF EMBODIMENTS

To make objectives, technical solutions, and advantages of this application clearer, the following further describes implementations of this application in detail with reference to accompanying drawings.

Figure 1:
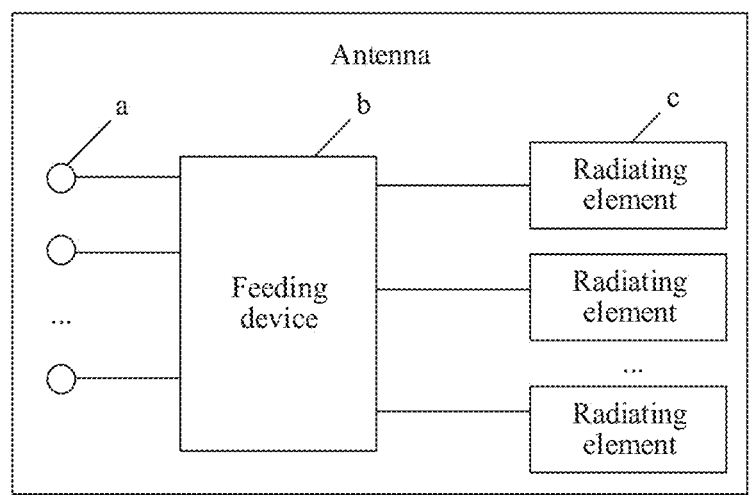
FIG. 1 is a schematic diagram of an antenna according to an embodiment of this application.

An antenna is one of important components of an electronic device. Referring to FIG. 1, the antenna includes components such as at least M signal input ends a, a feeding device b, and at least N radiating elements c. The feeding device b has M input ends and N output ends. Each of the M input ends of the feeding device b is connected to one signal input end a, and each of the N output ends of the feeding device b is connected to one radiating element c or one column of radiating elements c. M is an integer greater than 1, and N is an integer greater than or equal to 1.

The feeding device b receives current signals that are of different frequency bands and that are input by the M signal input ends a, obtains at least N current signals having different current intensity and phases based on the received current signals of the different frequency bands, and sends one of the obtained current signals to each radiating element c/each column of radiating elements c. Each radiating element c/Each column of radiating elements c receives one of the current signals, converts the current signal into an electromagnetic wave signal, and radiates the electromagnetic wave signal. For detailed implementations of the feeding device b, refer to content in any one of the following embodiments.

Figure 2:
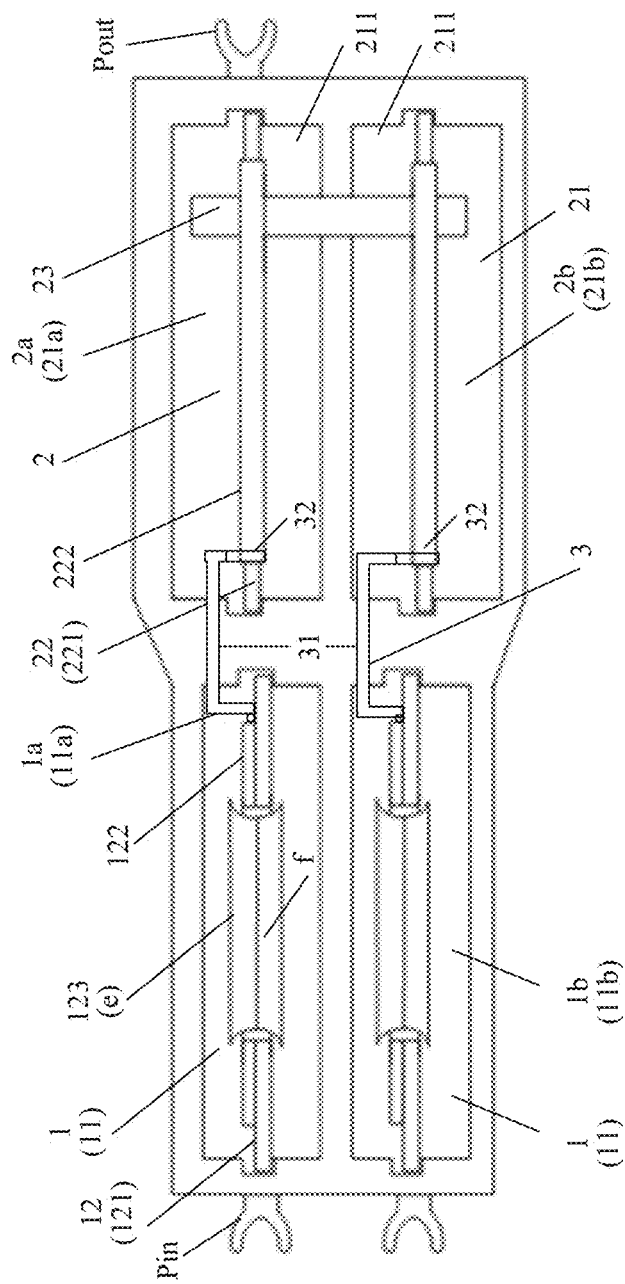
FIG. 2 is a schematic structural diagram of a feeding device according to an embodiment of this application.
Figure 3:
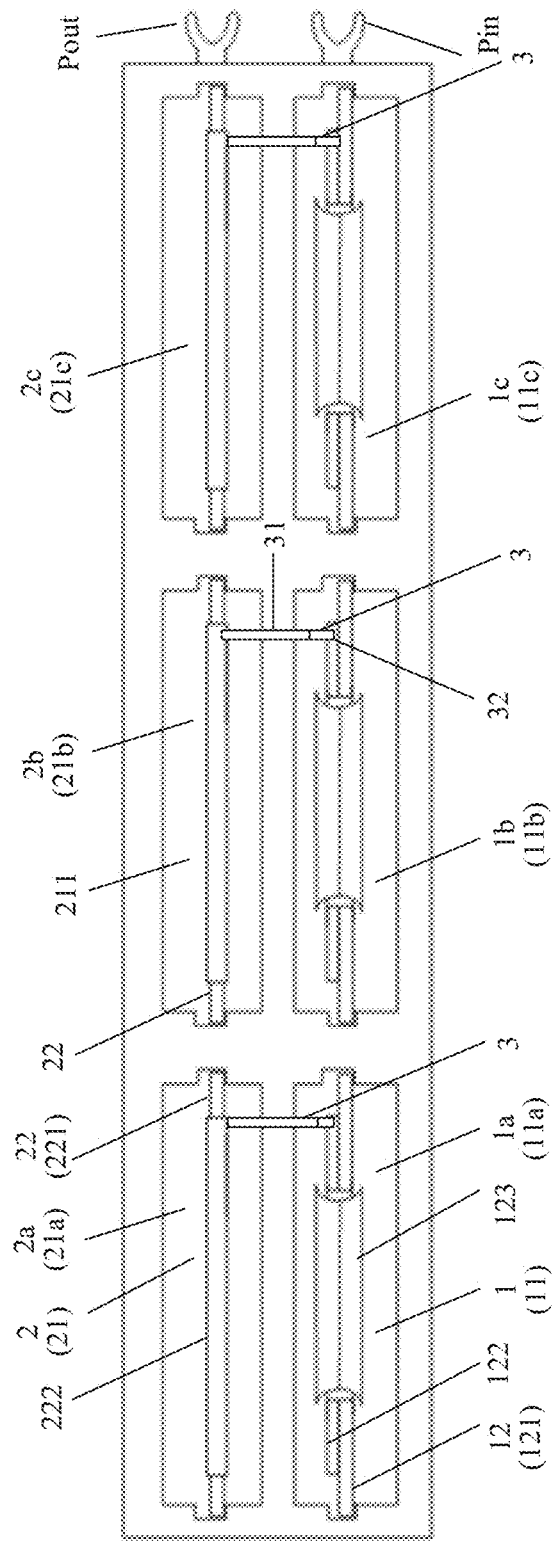
FIG. 3 is a schematic structural diagram of another feeding device according to an embodiment of this application.

Referring to FIG. 2 or FIG. 3, an embodiment of this application provides a feeding device, including:

a phase shifter 1, a combiner 2, and a jumper component 3, where the phase shifter 1 has a first cavity 11, the combiner 2 has a second cavity 21, the first cavity 11 is adjacently connected to the second cavity 21, and the phase shifter 1 is connected to the combiner 2 by using the jumper component 3.

The feeding device may include M phase shifters 1 and N combiners 2.

Optionally, each phase shifter 1 has one input end and X output ends, where X is an integer greater than or equal to N. Each combiner 2 has M input ends and one output end. A $j^{th}$ output end of an $i^{th}$ phase shifter 1 is connected to an $i^{th}$ input end of a $j^{th}$ combiner 2 by using the jumper component 3, where i=1, 2, . . . , and M, and j=1, 2, . . . , and N. When N is less than X, some output ends of each phase shifter 1 are vacant. To be specific, the output ends are not connected, are suspended, are not processed, and may not be connected to the combiner.

An input end of the $i^{th}$ phase shifter 1 is connected to one signal input end a on an antenna, and is configured to: receive a current signal that is of one frequency band and that is input by the signal input end a, change a phase of the current signal, change current intensity of the current signal, and obtain X current signals having different current intensity and phases. The X current signals still belong to a same frequency band, and one of the current signals is output from each output end.

The $j^{th}$ combiner is connected to one radiating element c/one column of radiating elements c on the antenna, and is configured to: receive a current signal of one frequency band from a $j^{th}$ output end of a first phase shifter 1, receive a current signal of another frequency band from a $j^{th}$ output end of a second phase shifter 1, . . . , receive a current signal of another frequency band from a $j^{th}$ output end of an $M^{th}$ phase shifter 1, that is, receive current signals of M frequency bands, combine the current signals of the M frequency bands into one current signal, and input the one current signal into the radiating element c.

In this application, technical difficulties are overcome, the first cavity 11 is adjacently connected to the second cavity 21, and a distance between the phase shifter 1 and the combiner 2 becomes relatively short, so that the jumper component 3 is also relatively short, thereby reducing costs and a signal loss of the feeding device.

Optionally, the first cavity 11 and the second cavity 21 may be integrally formed. For example, a part or all of a lower cavity wall of the first cavity 11 and a part or all of an upper cavity wall of the second cavity 21 are a same cavity wall; or a part or all of a left cavity wall of the first cavity 11 and a part or all of a right cavity wall of the second cavity 21 are a same cavity wall. The upper, lower, left, and right herein are merely examples. This is not limited in this application.

The M phase shifters 1 and the N combiners 2 may be arranged in the following two layout manners.

Figure 4:
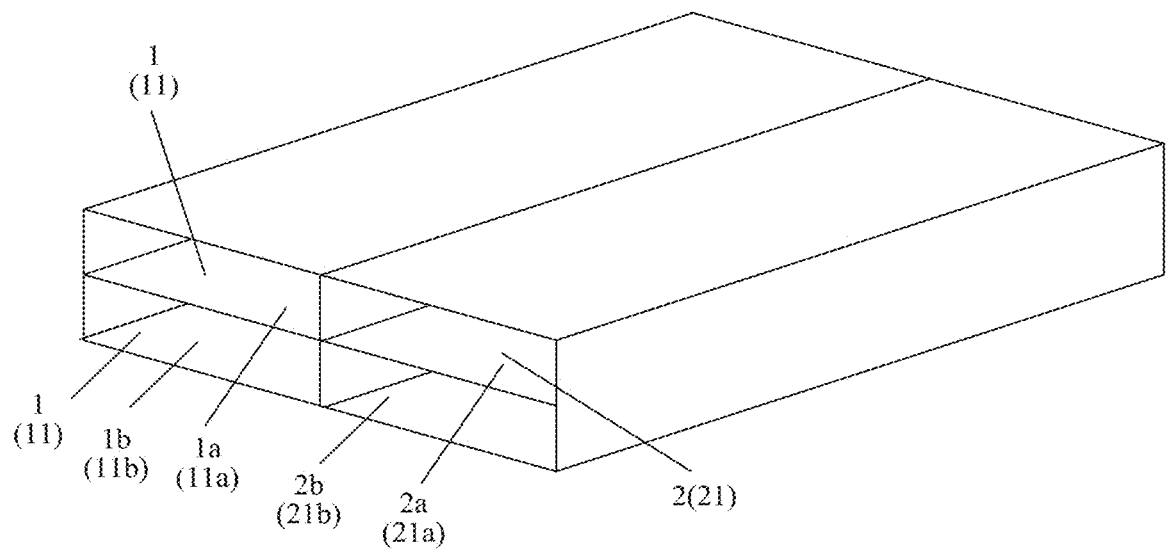
FIG. 4 is a schematic structural diagram of an appearance of a feeding device according to an embodiment of this application.

In a first layout manner, referring to FIG. 2 and FIG. 4, the M phase shifters 1 may be placed side by side in an up-and-down direction, and the N combiners 2 may be placed in serial one by one. That is, the N combiners 2 are placed side by side in a left-and-right direction. In addition, each of the combiners 2 is adjacent to the M phase shifters 1.

Figure 5:
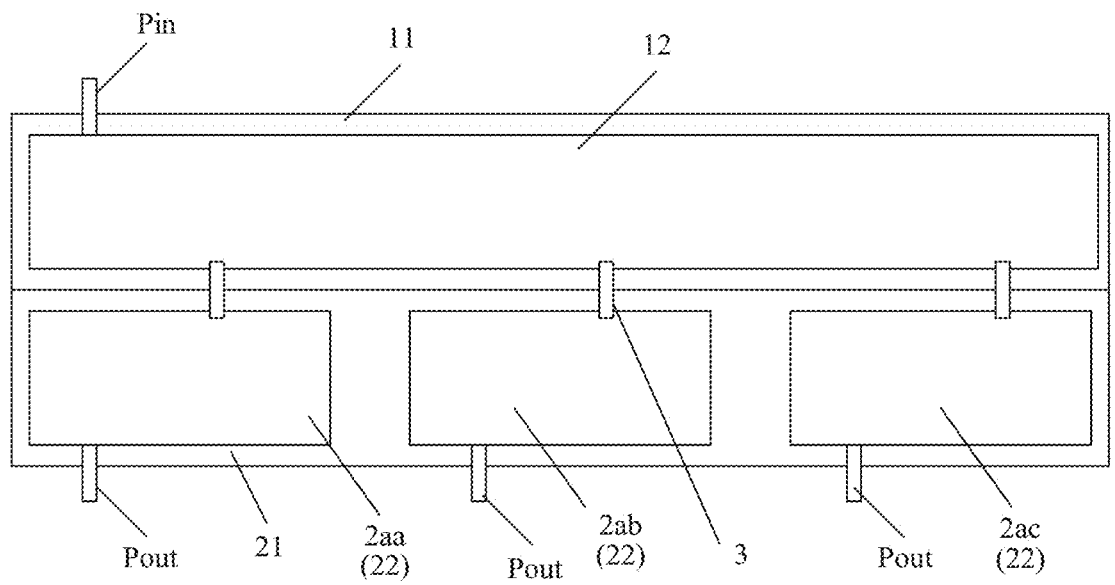
FIG. 5 is a top view of a feeding device according to an embodiment of this application.

For example, in the example shown in FIG. 2, the feeding device includes a first phase shifter 1a and a second phase shifter 1b, that is, M=2. The first phase shifter 1a and the second phase shifter 1b are placed side by side in the up-and-down direction. Referring to FIG. 5, the feeding device includes a first combiner 2aa, a second combiner 2ab, and a third combiner 2ac, that is. N=3. The first combiner 2aa, the second combiner 2ab, and the third combiner 2ac are placed in serial one by one.

Figure 6:
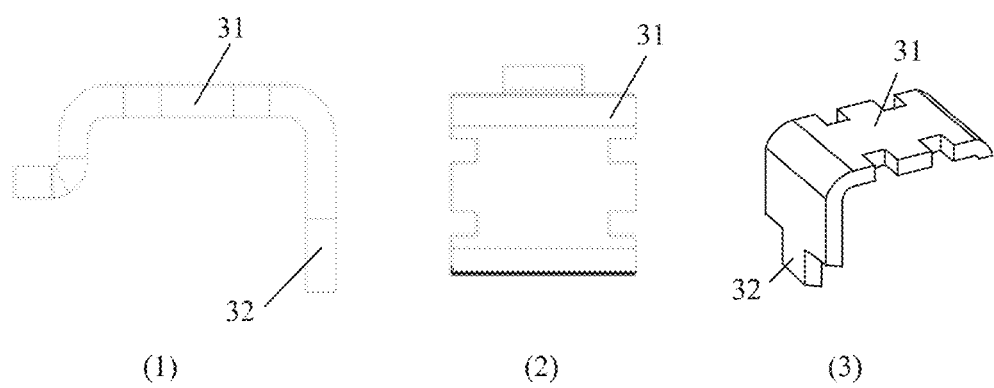
FIG. 6 is a schematic structural diagram of a jumper component according to an embodiment of this application.

In the first layout manner, a structure of the jumper component 3 is shown in FIG. 6, and the jumper component 3 includes a metal sheet 31 and a plug connector 32. A width of the metal sheet 31 is greater than a width of the plug connector 32, and the plug connector 32 is fastened at an edge of the metal sheet 31. Referring to FIG. 6(1) to FIG. 6(3), two opposite ends of the metal sheet 31 are bent, in a same direction, into bent portions, and the plug connector 32 is fastened at one of the bent portions. Widths and shapes of the metal sheet 31 and the plug connector 32 herein are merely examples. This is not limited in this application.

Referring to FIG. 2, the other bent portion of the metal sheet 31 is welded to the phase shifter 1, and the plug connector 32 is plug-connected to the combiner 2, or the other bent portion of the metal sheet 31 is welded to the combiner 2, and the plug connector 32 is plug-connected to the phase shifter 1, to implement a connection between the phase shifter 1 and the combiner 2.

During implementation, the $j^{th}$ output end of the $i^{th}$ phase shifter 1 is welded to the metal sheet 31, the plug connector 32 is plug-connected to the $i^{th}$ input end of the $j^{th}$ combiner 2, and a jack is provided on the $i^{th}$ input end of the $j^{th}$ combiner 2. Alternatively, the $i^{th}$ input end of the $j^{th}$ combiner 2 is welded to the metal sheet 31, the plug connector 32 is plug-connected to the $j^{th}$ output end of the $i^{th}$ phase shifter 1, and a jack is provided on the $j^{th}$ output end of the $i^{th}$ phase shifter 1.

In the first layout manner, first cavities 11 of different phase shifters 1 may be different cavities. For example, in the example shown in FIG. 2, a first cavity 11a of the first phase shifter 1a and a first cavity 11b of the second phase shifter 1b are two different cavities. Alternatively, referring to FIG. 7, first cavities 11 of different phase shifters 1 are a same cavity. For example, in the example shown in FIG. 7, the first phase shifter 1a and the second phase shifter 1b have a same first cavity 11.

For a structure in which first cavities 11 of different phase shifters 1 are different cavities, the first cavities 11 of the different phase shifters 1 may be placed side by side in the up-and-down direction. For example, in examples shown in FIG. 2 and FIG. 4, the first cavity 11a of the first phase shifter 1a and the first cavity 11b of the second phase shifter 1b are placed side by side in the up-and-down direction.

For the structure in which the first cavities 11 of the different phase shifters 1 are different first cavities, structures of phase shifters 1 may be the same. For the $i^{th}$ phase shifter 1, the $i^{th}$ phase shifter 1 may further include a phase shift unit 12 in addition to the first cavity 11.

Referring to FIG. 5 (FIG. 5 is a top view of FIG. 2), the phase shift unit 12 has one input end Pin and X output ends (not shown in the figure), and the phase shift unit 12 is mounted in the first cavity 11. The input end Pin may extend out of the first cavity 11 and be used as the input end of the $i^{th}$ phase shifter 1, and the $j^{th}$ output end is connected to the $i^{th}$ input end of the $j^{th}$ combiner by using the jumper component 3.

Figure 7:
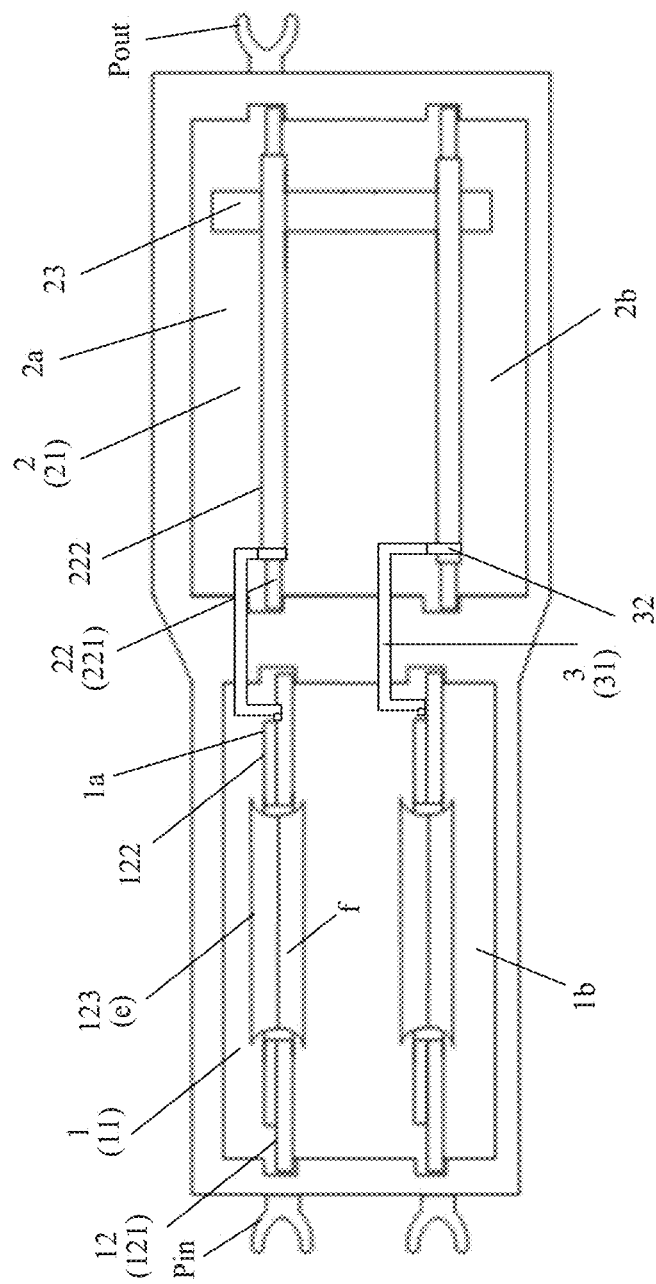
FIG. 7 is a schematic structural diagram of another feeding device according to an embodiment of this application.

For a structure in which first cavities 11 of different phase shifters 1 are a same cavity, referring to FIG. 7, each phase shifter 1 further has a respective phase shift unit 12, structures of phase shift units 12 of phase shifters 1 may be the same, and the phase shift units 12 of the phase shifters 1 are mounted in a same first cavity 11. In such a structure, the phase shift unit 12 of the $i^{th}$ phase shifter 1 has one input end Pin and X output ends (not shown in the figure). The input end Pin may extend out of the first cavity 11 and be used as the input end of the $i^{th}$ phase shifter 1, and the $j^{th}$ output end is connected to the $i^{th}$ input end of the $j^{th}$ combiner by using the jumper component 3.

For the structure in which the first cavities 11 of the different phase shifters 1 are the same cavity, to reduce signal impact mutually generated between two adjacent phase shift units 12, a distance between the two adjacent phase shift units 12 may be greater than a distance between two adjacent phase shift units 12 in the example shown in FIG. 2.

For the foregoing $i^{th}$ phase shifter 1, the phase shift unit 12 of the $i^{th}$ phase shifter 1 is configured to: receive a current signal that is of one frequency band and that is input by the signal input end a of the antenna, change a phase of the current signal, change current intensity of the current signal, obtain X current signals having different current intensity and phases, and output one of the current signals from each output end.

Optionally, referring to FIG. 2 and FIG. 4, in the first layout manner, for each combiner 2, for example, for the $j^{th}$ combiner 2, the second cavity 21 of the $j^{th}$ combiner 2 includes M chambers 211, and the M chambers 211 may be placed side by side in an up-and-down direction. The $j^{th}$ combiner 2 further includes M tributary units 22, and an $i^{th}$ tributary unit 22 of the $j^{th}$ combiner 2 is in a one-to-one correspondence with an $i^{th}$ chamber 211 of the $j^{th}$ combiner 2. The $j^{th}$ output end of the $i^{th}$ phase shifter 1 is connected to the $i^{th}$ tributary unit 22 of the $j^{th}$ combiner 2 by using the jumper component 3.

For example, in the example shown in FIG. 2, the $j^{th}$ combiner 2 may include two tributary units 22: a first tributary unit 2a and a second tributary unit 2b. The second cavity 21 of the $j^{th}$ combiner 2 includes two chambers 211: a first chamber 21a and a second chamber 21b. The first chamber 21a and the second chamber 21b are placed side by side in the up-and-down direction, the first tributary unit 2a corresponds to the first chamber 21a, and the first tributary unit 2a is connected to the $j^{th}$ output end of the first phase shifter 1a by using the jumper component 3. The second tributary unit 2b corresponds to the second chamber 21b, and the second tributary unit 2b is connected to the $j^{th}$ output end of the second phase shifter 1b by using the jumper component 3.

Referring to FIG. 2, for each combiner 2, for example, for the $j^{th}$ combiner 2, an input end of the $i^{th}$ tributary unit 22 in the $j^{th}$ combiner 2 is the $i^{th}$ input end of the $j^{th}$ combiner 2, and is connected to the $j^{th}$ output end of the $i^{th}$ phase shifter 1 by using the jumper component 3. Output ends of the M tributary units 22 included in the $j^{th}$ combiner 2 are all connected to a pin 23, and the pin 23 is then connected to an output end Pout of the $j^{th}$ combiner.

Referring to FIG. 5, $i^{th}$ tributary units 22 of combiners 2 may communicate with each other, and a relatively large distance may be kept between two adjacent $i^{th}$ tributary units 22 in the $i^{th}$ tributary units 22 of the combiners 2, to reduce signal impact mutually generated between the two adjacent $i^{th}$ tributary units 22.

Alternatively, $i^{th}$ tributary units 22 of combiners 2 may not communicate with each other. The $i^{th}$ tributary units 22 of the combiners 2 are in different chambers. In this way, isolation between two adjacent tributary units 22 may be increased.

Optionally, referring to FIG. 7, in the first layout manner, the second cavity 21 of the $j^{th}$ combiner 2 has one chamber in total, each combiner 2 further includes M tributary units 22, and the M tributary units 22 are mounted in the second cavity 21. The M tributary units 22 all correspond to a same chamber. The $j^{th}$ output end of the $i^{th}$ phase shifter 1 is connected to the $i^{th}$ tributary unit 22 of the $j^{th}$ combiner by using the jumper component 3.

In an implementation of FIG. 7, the M tributary units 22 included in the $j^{th}$ combiner 2 are placed side by side in the up-and-down direction. An input end of the $i^{th}$ tributary unit 22 in the $j^{th}$ combiner 2 is the $i^{th}$ input end of the $j^{th}$ combiner 2, and is connected to the $j^{th}$ output end of the $i^{th}$ phase shifter 1 by using the jumper component 3. The output ends of the M tributary units 22 included in the $j^{th}$ combiner 2 are all connected to the pin 23, and the pin 23 is then connected to the output end Pout of the $j^{th}$ combiner 2.

For some electronic devices, a volume of such an electronic device is usually relatively large, the electronic device does not have a high requirement on a volume size of an antenna, and a relatively large volume of the antenna may be allowed. In this case, the second cavity 21 of the combiner 2 has one chamber, and a height of the second cavity 21 is relatively high. In this way, a distance between two adjacent tributary units 22 may be relatively large, thereby reducing impact of the two adjacent tributary units 22 on each other.

Alternatively, for some electronic devices, an antenna of the electronic device does not have a high requirement on isolation of the combiner 2. In this case, second cavities 21 of combiners 2 have a same chamber, and an isolation plate is further disposed between two adjacent tributary units 22 in the second cavity 21. A material of the isolation plate may be metal.

Optionally, the second cavities 21 of the combiners 2 may communicate with each other. In the second cavity 21, a relatively large distance may be kept between two adjacent combiners 2, to reduce signal impact mutually generated between the two adjacent combiners 2.

Alternatively, the second cavities 21 of the combiners 2 may not communicate with each other. That is, the second cavities 21 of the combiners 2 are different second cavities 21. In this way, isolation between two adjacent combiners 2 may be increased.

In a second layout manner, referring to FIG. 3 and FIG. 8, the M phase shifters 1 may be placed side by side in a left-and-right direction, and the N combiners 2 may be placed in serial above the M phase shifters 1, or the N combiners 2 may be placed in serial below the M phase shifters 1.

Figure 9:
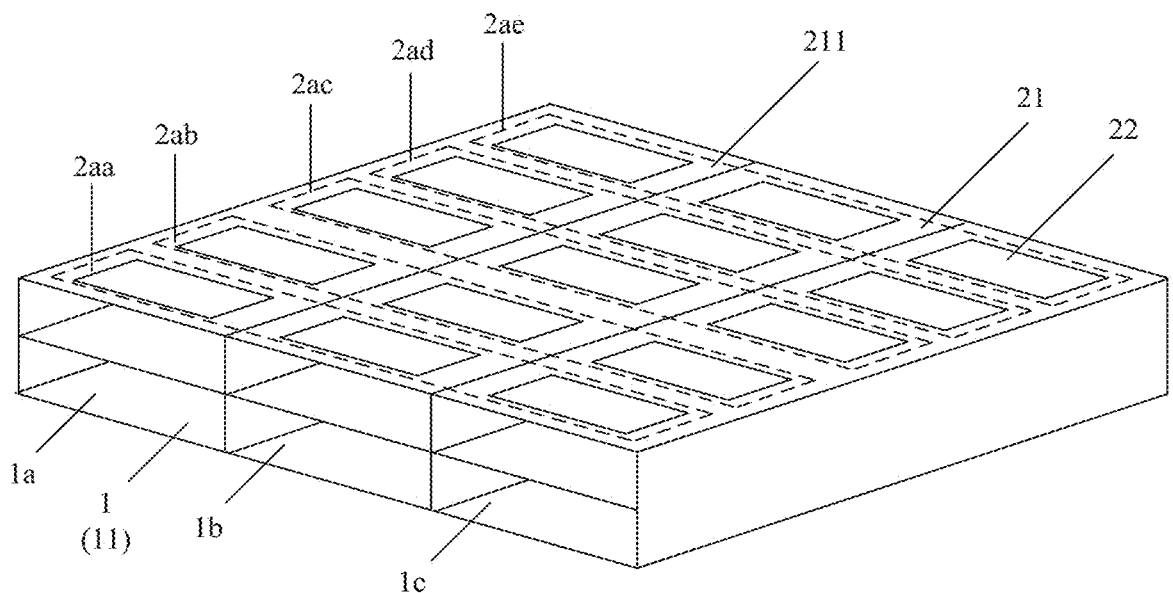
FIG. 9 is an oblique view of a feeding device according to an embodiment of this application.

For example, in the examples shown in FIG. 3 and FIG. 9, the feeding device includes a first phase shifter 1a, a second phase shifter 1b, and a third phase shifter 1c, that is, M=3, and includes a first combiner 2aa, a second combiner 2ab, a third combiner 2ac, a fourth combiner 2ad, and a fifth combiner 2ae, that is, N=5. The first phase shifter 1a, the second phase shifter 1b, and the third phase shifter 1c are placed side by side in the left-and-right direction, and the first combiner 2aa, the second combiner 2ab, the third combiner 2ac, the fourth combiner 2ad, and the fifth combiner 2ae are placed in serial above the three phase shifters 1.

Figure 10:
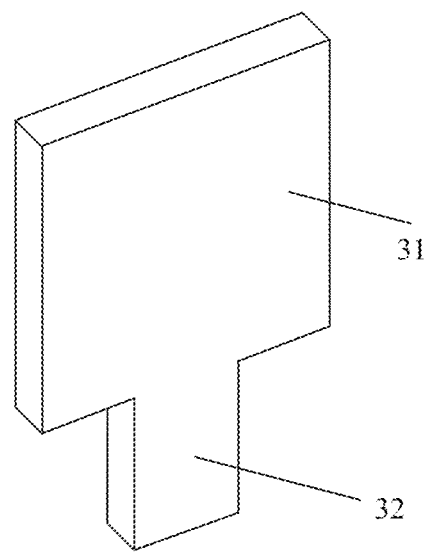
FIG. 10 is a schematic structural diagram of another jumper component according to an embodiment of this application.

In the second layout manner, a structure of the jumper component 3 is shown in FIG. 10, and the jumper component 3 includes a metal sheet 31 and a plug connector 32. A width of the metal sheet 31 is greater than a width of the plug connector 32, and the plug connector 32 is fastened at an edge of the metal sheet 31.

The metal sheet 31 is of a planar structure, and is welded to the phase shifter 1, and the plug connector 32 is plug-connected to the combiner 2, or the metal sheet 31 is welded to the combiner 2, and the plug connector 32 is plug-connected to the phase shifter 1, to implement connection between the phase shifter 1 and the combiner 2 in a vertical direction.

During implementation, the $j^{th}$ output end of the $i^{th}$ phase shifter 1 is welded to the metal sheet 31, the plug connector 32 is plug-connected to the $i^{th}$ input end of the $j^{th}$ combiner 2, and a jack is provided on the $i^{th}$ input end of the $j^{th}$ combiner 2. Alternatively, the $i^{th}$ input end of the $j^{th}$ combiner 2 is welded to the metal sheet 31, the plug connector 32 is plug-connected to the $j^{th}$ output end of the $i^{th}$ phase shifter 1, and a jack is provided on the $j^{th}$ output end of the $i^{th}$ phase shifter 1.

For the jumper component 3 in FIG. 6 or FIG. 10, the metal sheet 31 and the plug connector 32 that are included in the jumper component 3 may be integrally formed.

In the second layout manner, first cavities 11 of different phase shifters 1 may be different first cavities 11. For example, in the example shown in FIG. 3, the first cavity 11a of the first phase shifter 1a, the first cavity 11b of the second phase shifter 1b, and the first cavity 11c of the third phase shifter 1c are three different cavities, and the three first cavities 11 are placed side by side in the left-and-right direction.

Referring to FIG. 3, in the second layout manner, structures of phase shifters 1 may be the same. For the $i^{th}$ phase shifter 1, the $i^{th}$ phase shifter 1 may further include a phase shift unit 12 in addition to the first cavity 11.

The phase shift unit 12 has one input end Pin and X output ends (not shown in the figure), and the phase shift unit 12 is mounted in the first cavity 11. The input end Pin may extend out of the first cavity 11 and be used as an input end of the $i^{th}$ phase shifter 1, and the $j^{th}$ output end is connected to the $i^{th}$ input end of the $j^{th}$ combiner by using the jumper component 3.

Figure 8:
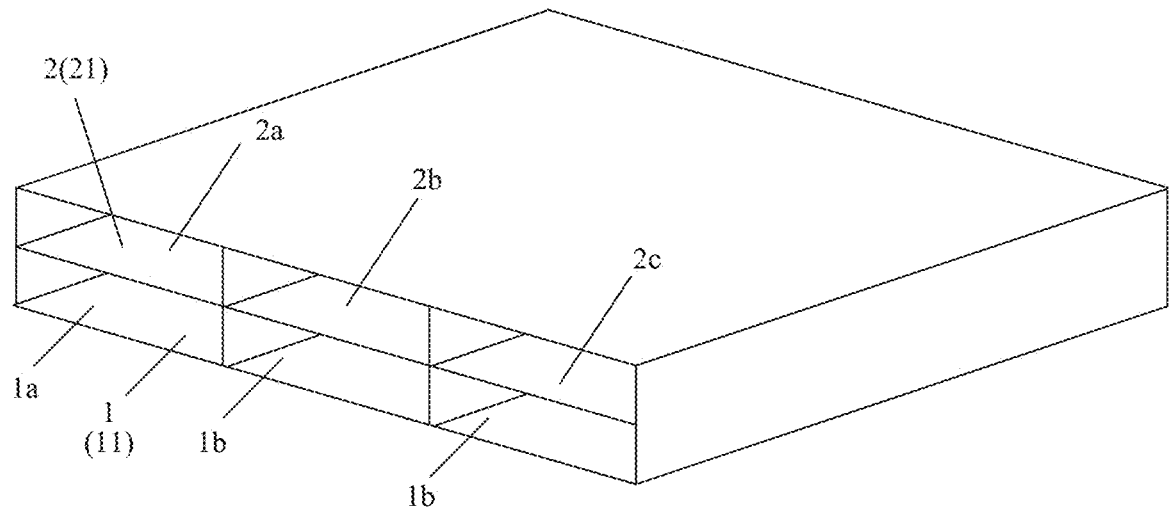
FIG. 8 is a schematic structural diagram of an appearance of another feeding device according to an embodiment of this application.

Optionally, referring to FIG. 3 and FIG. 8, in the second layout manner, for a $j^{th}$ combiner 2, the second cavity 21 of the $j^{th}$ combiner 2 includes M chambers 211, and the M chambers 211 may be placed side by side in the left-and-right direction. The combiner 2 further includes M tributary units 22, the $i^{th}$ tributary unit 22 of the $j^{th}$ combiner 2 is in a one-to-one correspondence with the $i^{th}$ chamber 211, and the $j^{th}$ output end of the $i^{th}$ phase shifter 1 is connected to the $i^{th}$ tributary unit 22 by using the jumper component 3.

For example, in the example shown in FIG. 3, the second cavity 21 of the $j^{th}$ combiner 2 includes three chambers 211: a first chamber 21*a*, a second chamber 21*b*, and a third chamber 21*c*. The combiner 2 further includes a first tributary unit 2*a*, a second tributary unit 2*b*, and a third tributary unit 2*c*. The first chamber 21*a*, the second chamber 21*b*, and the third chamber 21*c* are placed side by side in the left-and-right direction. The first tributary unit 2*a* corresponds to the first chamber 21*a*, and the first tributary unit 2*a* is connected to the $j^{th}$ output end of the first phase shifter 1*a* by using the jumper component 3. The second tributary unit 2*b* corresponds to the second chamber 21*b*, and the second tributary unit 2*b* is connected to the $j^{th}$ output end of the second phase shifter 1*b* by using the jumper component 3. The third tributary unit 2*c* corresponds to the third chamber 21*c*, and the third tributary unit 2*c* is connected to the $j^{th}$ output end of the third phase shifter 1*c* by using the jumper component 3.

Referring to FIG. 3, for each combiner 2, for example, for the $j^{th}$ combiner 2, an input end of the $i^{th}$ tributary unit 22 in the $j^{th}$ combiner 2 is an $i^{th}$ input end of the $j^{th}$ combiner 2, and is connected to the $j^{th}$ output end of the $i^{th}$ phase shifter 1 by using the jumper component 3. Output ends of the M tributary units 22 included in the $j^{th}$ combiner 2 are all connected to a pin 23, and the pin 23 is then connected to an output end Pout of the $j^{th}$ combiner.

Referring to FIG. 9, $i^{th}$ chambers 211 of combiners 2 may communicate with each other. In an $i^{th}$ chamber 211, a relatively large distance may be kept between two adjacent $i^{th}$ tributary units 22, to reduce mutual signal impact between the two adjacent $i^{th}$ tributary units 22.

Alternatively, $i^{th}$ chambers 211 of combiners 2 may not communicate with to each other. That is, the $i^{th}$ chambers 211 of the combiners 2 are different chambers. In this way, isolation between two adjacent $i^{th}$ tributary units 22 may be increased.

A material of the first cavity 11 of the $i^{th}$ phase shifter 1 in any one of the foregoing layout manners may be metal, and the first cavity 11 may be used as a ground end of the $i^{th}$ phase shifter 1. A material of the second cavity 21 of the $j^{th}$ combiner 2 may be metal, and the second cavity 21 may be used as a ground end of the $j^{th}$ combiner 2.

For the phase shift unit 12 of the $i^{th}$ phase shifter 1 in any one of the foregoing layout manners, referring to FIG. 2, FIG. 3, and FIG. 7, the phase shift unit 12 includes a first support medium 121 and a first wired network 122, where the first wired network 122 is mounted in the first cavity 11 of the $i^{th}$ phase shifter 1 by using the first support medium 121, and the first wired network 122 has one input end Pin and X output ends (not shown in the figure).

The input end Pin of the first wired network 122 extends out of the first cavity 11 and is used as the input end Pin of the $i^{th}$ phase shifter 1, and a $j^{th}$ output end of the first wired network 122 is connected to the $i^{th}$ input end of the $j^{th}$ combiner 2.

Optionally, the first wired network 122 may be attached onto a surface of the first support medium 121. For example, the first support medium 121 is a medium of a printed circuit board, and the first wired network 122 is a copper clad layer of the printed circuit board.

The input end Pin of the first wired network 122 is connected to one signal input end a on an antenna, and is configured to: receive a current signal that is of one frequency band and that is input by the signal input end a, change a phase of the current signal, change current intensity of the current signal, obtain X current signals having different current intensity and phases, and output one of the current signals from each output end.

Optionally, referring to FIG. 2, FIG. 3, and FIG. 7, sliding slots are disposed on two opposite inner side walls of the first cavity 11, and the first support medium 121 is mounted in the first cavity 11 by using the sliding slots on the two inner side walls.

Optionally, still referring to FIG. 2, FIG. 3, and FIG. 7, the phase shift unit 12 further includes a sliding medium 123, a sliding hole is provided in the first support medium 121, the sliding medium 123 is mounted in the sliding hole, and the sliding medium 123 may slide in the sliding hole.

A pull rod may be used to drive the sliding medium 123 to slide in the sliding hole. The sliding medium 123 is in contact with the first wired network 122. The sliding of the sliding medium 123 in the sliding hole may change a phase of a current signal output by the first wired network 122 from each output end.

Optionally, referring to FIG. 2, the sliding medium 123 includes: a first sliding medium e and a second sliding medium f, where the first sliding medium e and the second sliding medium f are buckled together to form the sliding medium 123.

Figure 11:
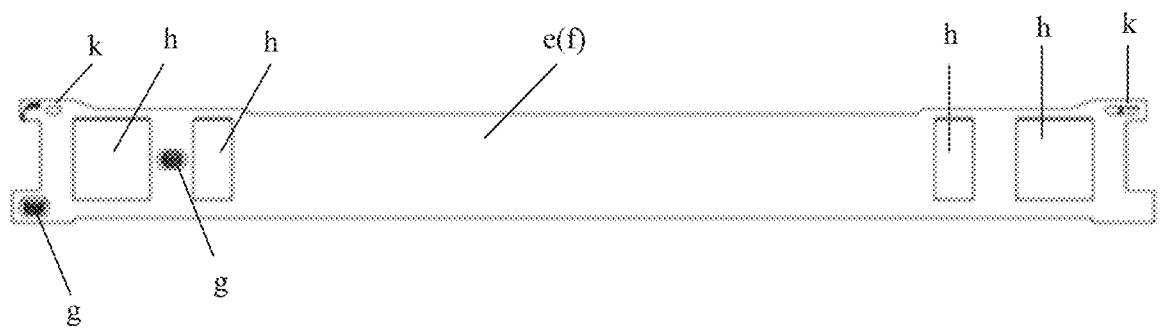
FIG. 11 is a schematic structural diagram of a sliding medium according to an embodiment of this application.

Optionally, referring to FIG. 11, a buckle structure g is disposed between the first sliding medium e and the second sliding medium f, and the buckle structure g enables the first sliding medium e and the second sliding medium f to be buckled together to form the sliding medium 123.

Optionally, referring to FIG. 11, at least one through hole h is provided at each of two ends of the sliding medium 123.

Optionally, referring to FIG. 11, a pull hole k is further provided in at least one end of the two ends of the sliding medium 123, and the pull rod may hook the pull hole k, so that the pull rod drives the sliding medium 123 to slide.

There are a plurality of structures of the first wired network 122 in the $i^{th}$ phase shifter 1. The following two structures of the first wired network 122 are listed in this application. Other structures are not listed one by one, and the two structures are respectively as follows.

Figure 12:
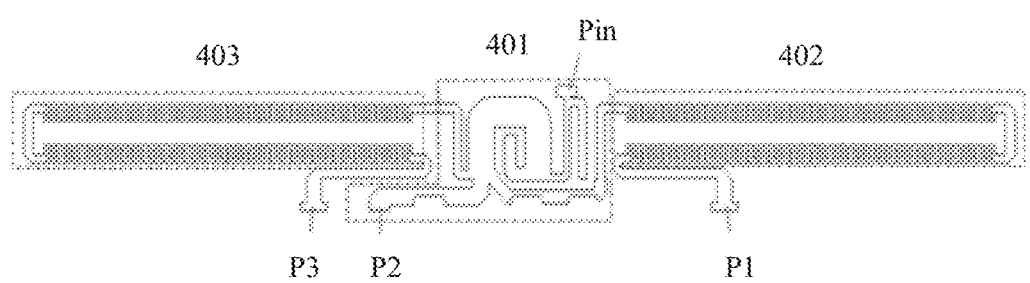
FIG. 12 is a schematic structural diagram of a first wired network according to an embodiment of this application.

For a first structure of the first wired network 122, refer to FIG. 12. The first wired network 122 has one input end Pin and three output ends P1, P2, and P3, and further includes: a main power divider 401, a first phase-shift transmission line 402, and a second phase-shift transmission line 403, where an input end Pin of the main power divider 401 is an input end of the $i^{th}$ phase shifter 1, a first output end of the main power divider 401 is connected to an input end of the first phase-shift transmission line 402, and an output end of the first phase-shift transmission line 402 is used as a first output end P1 of the $i^{th}$ phase shifter 1: and a second output end P2 of the main power divider 401 is used as a second output end P2 of the $i^{th}$ phase shifter 1, a third output end of the main power divider 401 is connected to an input end of the second phase-shift transmission line 403, an output end of the second phase-shift transmission line 403 is used as a third output end P3 of the $i^{th}$ phase shifter 1.

In the first structure, referring to FIG. 11, two through holes h are respectively provided at two ends of the sliding medium 123.

Figure 13:
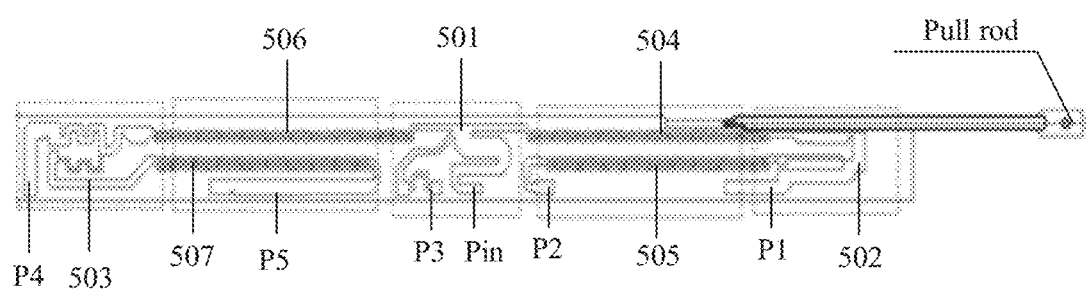
FIG. 13 is a schematic structural diagram of another first wired network according to an embodiment of this application.

For a second structure of the first wired network 122, refer to FIG. 13. The first wired network 122 has one input end Pin and five output ends P1, P2, P3, P4, and P5, and further includes:

a main power divider 501, a first power divider 502, a second power divider 503, a first phase-shift transmission line 504, a second phase-shift transmission line 505, a third phase-shift transmission line 506, and a fourth phase-shift transmission line 507, where an input end Pin of the main power divider 501 is an input end Pin of the $i^{th}$ phase shifter 1, a first output end is connected to an input end of the first phase-shift transmission line 504, and an output end of the first phase-shift transmission line 504 is connected to an input end of the first power divider 502;

a first output end of the first power divider 502 is used as a first output end P1 of the $i^{th}$ phase shifter 1, a second output end is connected to an input end of the second phase-shift transmission line 505, and an output end of the second phase-shift transmission line 505 is used as a second output end P2 of the $i^{th}$ phase shifter;

a second output end of the main power divider 501 is used as a third output end P3 of the $i^{th}$ phase shifter 1, a third output end is connected to an input end of the third phase-shift transmission line 506, and an output end of the third phase-shift transmission line 506 is connected to an input end of the second power divider 503; and a first output end of the second power divider 503 is used as a fourth output end P4 of the $i^{th}$ phase shifter, a second output end is connected to an input end of the fourth phase-shift transmission line 507, and an output end of the fourth phase-shift transmission line 507 is used as a fifth output end P5 of the $i^{th}$ phase shifter.

Figure 14:
FIG. 14 is a schematic structural diagram of another sliding medium according to an embodiment of this application.

In the second structure, referring to FIG. 14, four through holes h are provided at two ends of the sliding medium 123.

For the $i^{th}$ tributary unit 22 of the $j^{th}$ combiner 2 in any one of the foregoing layout manners, referring to FIG. 2, FIG. 3, and FIG. 7, and the $i^{th}$ tributary unit 22 includes:

a second support medium 221 and a second wired network 222, where the second wired network 222 is mounted in a chamber 211 corresponding to the $i^{th}$ tributary unit 22 by using the second support medium 221; and an input end of the second wired network 222 is connected to the $j^{th}$ output end of the $i^{th}$ phase shifter 1 by using the jumper component 3, and an output end is connected to the output end Pout of the $j^{th}$ combiner 2.

Optionally, sliding slots are disposed on two opposite inner side walls of the chamber 211 corresponding to the $i^{th}$ tributary unit 22, and the second support medium 221 is mounted in the chamber 211 corresponding to the $i^{th}$ tributary unit 22 by using the sliding slots on the two inner side walls.

In this embodiment of this application, because the first cavity is adjacently connected to the second cavity, a distance between the phase shifter and the combiner becomes relatively short, so that the jumper component is also relatively short, thereby reducing costs of the feeding device and a signal loss.

An embodiment of this application provides an antenna, including the feeding device provided in any one of the foregoing embodiments.

An embodiment of this application provides an electronic device, including the feeding device provided in any one of the foregoing embodiments, and/or the antenna provided in the foregoing embodiments.

The foregoing descriptions are merely optional embodiments of this application, but are not intended to limit this application. Any modification, equivalent replacement, or improvement made without departing from the spirit and principle of this application shall fall within the protection scope of this application.

What is claimed is:

1. A feeding device for wireless communications, comprising:
a phase shifter, a combiner, and a jumper component, wherein
the phase shifter has a first cavity, the combiner has a second cavity adjacent to and connected to the first cavity, and the phase shifter is connected to the combiner through the jumper component.

2. The feeding device according to claim 1, wherein the phase shifter is a first phase shifter, the feeding device comprises at least a second phase shifter, and wherein the at least the second phase shifter shares the first cavity with the first phase shifter or each of the at least the second phase shifter has a cavity different from the first cavity.

3. The feeding device according to claim 2, wherein each of the at least the second phase shifter has a cavity different from the first cavity, and wherein first cavity and the cavity corresponding to each of the at least the second phase shifter are placed side-by-side in a horizontal direction or a vertical direction.

4. The feeding device according to claim 1, wherein the combiner is one of one or more combiners comprised in the feeding device, and each of the one or more combiners comprises a cavity that comprises more than one chamber, each of the more than one chamber comprises more than one tributary unit,
an $i^{th}$ tributary unit of the $j^{th}$ combiner has a one-to-one correspondence with an $i^{th}$ chamber, and wherein a $j^{th}$ output end of an $i^{th}$ phase shifter is connected to the $i^{th}$ tributary unit of the $j^{th}$ combiner through the jumper component.

5. The feeding device according to claim 4, wherein the more than one chamber is placed side-by-side in a horizontal direction or a vertical direction.

6. The feeding device according to claim 1, wherein the first cavity and the second cavity are integrally formed.

7. The feeding device according to claim 1, wherein the jumper component comprises:
a metal sheet and a plug connector, wherein the plug connector is fastened at an edge of the metal sheet,
the metal sheet is welded to the phase shifter, and the plug connector is plugged to the combiner.

8. The feeding device according to claim 7, wherein the metal sheet and the plug connector are integrally formed.

9. The feeding device according to claim 1, wherein the feeding device is comprised in an antenna.

10. The feeding device according to claim 1, wherein the feeding device is comprised in an electronic device.

11. The feeding device according to claim 1, wherein the jumper component comprises:
a metal sheet and a plug connector, wherein the plug connector is fastened on an edge of the metal sheet, the metal sheet is welded to the combiner, and the plug connector is plugged to the phase shifter.

* * * * *